United States Patent
Fukuya et al.

(10) Patent No.: US 8,700,732 B2
(45) Date of Patent: Apr. 15, 2014

(54) DISC REPRODUCING APPARATUS AND METHOD, PROGRAM, AND RECORDING MEDIUM

(75) Inventors: Katsunari Fukuya, Tokyo (JP); Akira Ando, Kanagawa (JP); Muneaki Osawa, Chiba (JP); Hiroshi Aruga, Tokyo (JP); Eriko Matsumura, Kanagawa (JP); Fuyuki Matsuyama, Tokyo (JP); Nobuhiro Inoue, Kanagawa (JP); Kazuo Yamaoka, Tokyo (JP); Sadamichi Bamba, Kanagawa (JP); Yukiko Akiyama, Tokyo (JP); Shinya Miyoshi, Tokyo (JP)

(73) Assignee: Sony Corporation (JP)

( * ) Notice: Subject to any disclaimer, the term of this patent is extended or adjusted under 35 U.S.C. 154(b) by 272 days.

(21) Appl. No.: 12/655,532

(22) Filed: Dec. 31, 2009

(65) Prior Publication Data
US 2010/0180008 A1   Jul. 15, 2010

(30) Foreign Application Priority Data
Jan. 6, 2009  (JP) ................ P2009-000516

(51) Int. Cl.
*G06F 15/16* (2006.01)
(52) U.S. Cl.
USPC .......................... 709/217; 709/203
(58) Field of Classification Search
USPC ................................ 709/217, 203
See application file for complete search history.

(56) References Cited

U.S. PATENT DOCUMENTS

| | | | | |
|---|---|---|---|---|
| 6,041,333 | A * | 3/2000 | Bretschneider et al. | 1/1 |
| 6,842,770 | B1 * | 1/2005 | Serlet et al. | 709/203 |
| 6,910,038 | B1 * | 6/2005 | James | 1/1 |
| 7,246,170 | B2 * | 7/2007 | Kanai et al. | 709/229 |
| 7,266,691 | B1 * | 9/2007 | Ishiguro et al. | 713/168 |
| 7,747,560 | B2 * | 6/2010 | Goldthwaite et al. | 1/1 |
| 2004/0220791 | A1 * | 11/2004 | Lamkin et al. | 703/11 |
| 2005/0213597 | A1 * | 9/2005 | McNulty | 370/437 |
| 2008/0232212 | A1 | 9/2008 | Lee | |
| 2009/0327229 | A1 * | 12/2009 | O'Connor et al. | 707/3 |
| 2011/0276396 | A1 * | 11/2011 | Rathod | 705/14.49 |

FOREIGN PATENT DOCUMENTS

| | | |
|---|---|---|
| EP | 1600972 A1 | 11/2005 |
| EP | 1873784 A1 | 1/2008 |
| JP | 2001325259 A | 11/2001 |
| JP | 2002077806 A | 3/2002 |

(Continued)

OTHER PUBLICATIONS

Office Action from Japanese Application No. 2009-000516, dated Oct. 14, 2010.

(Continued)

*Primary Examiner* — Asghar Bilgrami
(74) *Attorney, Agent, or Firm* — Lerner, David, Littenberg, Krumholz & Mentlik, LLP

(57) ABSTRACT

A disc reproducing apparatus includes: program readout means for playing back a disc loaded therein to read a program recorded thereon; disc-content readout means for executing the read program to read a content recorded on the disc; network-content acquisition means for executing the read program to acquire a content stored in a device connected over a network; and display control means for executing the read program to control display of the content read from the disc, and the content acquired from the device connected over the network.

10 Claims, 11 Drawing Sheets

(56) References Cited

FOREIGN PATENT DOCUMENTS

| | | |
|---|---|---|
| JP | 2003259278 A | 9/2003 |
| JP | 2004192724 A | 7/2004 |
| JP | 2005260842 A | 9/2005 |
| JP | 2005267774 A | 9/2005 |
| JP | 2005339214 A | 12/2005 |
| JP | 2006074612 A | 3/2006 |
| WO | 20060073247 A1 | 7/2006 |

OTHER PUBLICATIONS

European Search Report EP 09181048, dated May 18, 2010.

* cited by examiner

DISC REPRODUCING APPARATUS AND METHOD, PROGRAM, AND RECORDING MEDIUM

CROSS-REFERENCE TO RELATED APPLICATION

The present application claims priority from Japanese Patent Application No. JP 2009-000516 filed in the Japanese Patent Office on Jan. 6, 2009, the entire content of which is incorporated herein by reference.

BACKGROUND OF THE INVENTION

1. Field of the Invention

The present invention relates to a disc reproducing apparatus and method, a program, and a recording medium, and, more particularly, to a disc reproducing apparatus and method, a program, and a recording medium, which can ensure free edition of an album, and can permit a user allowable to see the album to browse the album which is edited through a simple operation.

2. Description of the Related Art

Recently, for example, DVD (Digital Versatile Disc) players on which application software or the like for displaying a slideshow of pictures taken with a digital camera or so is installed are popular. When a DVD having a plurality of pictures recorded thereon is played back in such a DVD player, the pictures are displayed on a display at predetermined time intervals in order.

In addition, for example, there has been proposed a service which uploads data or the like of pictures, taken with a digital camera, from a personal computer or the like connected thereto over a network, and make the uploaded pictures as a Web site laid out like an album (see http://picasa.google.co.jp/(Non-patent Document 1)).

Such a service is called "on-line album service". For example, the on-line album service can allow remarks to be added to pictures taken by a friend, or can comments to be written for reference. In addition, the on-line album service can allow a picture to be added to or deleted from a predetermined album easily.

That is, the on-line album service can permit a plurality of users to freely edit a predetermined album. The use of such an on-line album service makes it possible to change the contents of an album once created. For example, snapshots taken by friends who attended a wedding can be added to an album having a collection of commemorative pictures taken at the wedding. Further, pictures of a child which have been taken in the growth process since the birth may be collected into a single album. Those albums can be gone public to a family and friends.

SUMMARY OF THE INVENTION

In case of using the on-line album service, however, a user generally needs to access a Web server using a personal computer or the like, and needs to make registration for membership or the like beforehand. Therefore, a user can browse pictures in a predetermined album only after being registered as a member operating a personal computer or the like.

If a DVD having a plurality of pictures recorded thereon is played back in a DVD player to display the pictures on a display, a person can browse pictures in an album without registering himself/herself operating a personal computer or the like. However, DVDs are generally limited in terms of the sequential writing, disabling alteration of the contents of an album once created.

It is therefore desirable to ensure free edition of an album and permit a user allowable to see the album to browse the album which is edited through a simple operation.

According to an embodiment of the present invention, there is provided a disc reproducing apparatus including program readout means for playing back a disc loaded therein to read a program recorded thereon; disc-content readout means for executing the read program to read a content recorded on the disc; network-content acquisition means for executing the read program to acquire a content stored in a device connected over a network; and display control means for executing the read program to control display of the content read from the disc, and the content acquired from the device connected over the network.

The disc reproducing apparatus can further include network-information readout means for executing the read program to read information recorded on the disc and specifying a recording position of the content stored in the device connected over the network.

The network-content acquisition means can specify a content to be acquired based on information added to the content stored in the device connected over the network.

A content taken within a predetermined period can be specified based on information added to the content and representing a shooting date and time on which the content has been taken.

A content taken at a predetermined location can be specified based on information added to the content and representing a shooting location at which the content has been taken.

The display control means can combine the content read from the disc and the content acquired from the device connected over the network, and display a resultant content.

According to another embodiment of the invention, there is provided a disc reproducing method including the steps of playing back a loaded disc to read a program recorded thereon; executing the read program to read a content recorded on the disc; executing the read program to acquire a content stored in a device connected over a network; and executing the read program to control display of the content read from the disc, and the content acquired from the device connected over the network.

According to a further embodiment of the invention, there is provided a program allowing a computer to function as a disc reproducing apparatus including disc-content readout means for reading a content recorded on a disc; network-content acquisition means for acquiring a content stored in a device connected over a network; and display control means for controlling display of the content read from the disc, and the content acquired from the device connected over the network.

According to a still further embodiment of the invention, there is provided a recording medium recording a program which allows a computer to function as a disc reproducing apparatus including disc-content readout means for reading a content recorded on a disc; network-content acquisition means for acquiring a content stored in a device connected over a network; and display control means for controlling display of the content read from the disc, and the content acquired from the device connected over the network.

The recording medium can be configured as a disc where information specifying a recording position of a content stored in the device connected over the network, and the content are recorded together with the program.

According to the embodiments of the invention, a loaded disc is played back to read a program recorded thereon, a content recorded on the disc is read out by executing the read program, a content stored in a device connected over a network is acquired by executing the read program, and display of the content read from the disc, and the content acquired from the device connected over the network is controlled by executing the read program.

According to the embodiments of the invention, it is possible to ensure free edition of an album and permit a user allowable to see the album to browse the album which is edited through a simple operation.

DETAILED DESCRIPTION OF THE PREFERRED EMBODIMENTS

Figure 1:
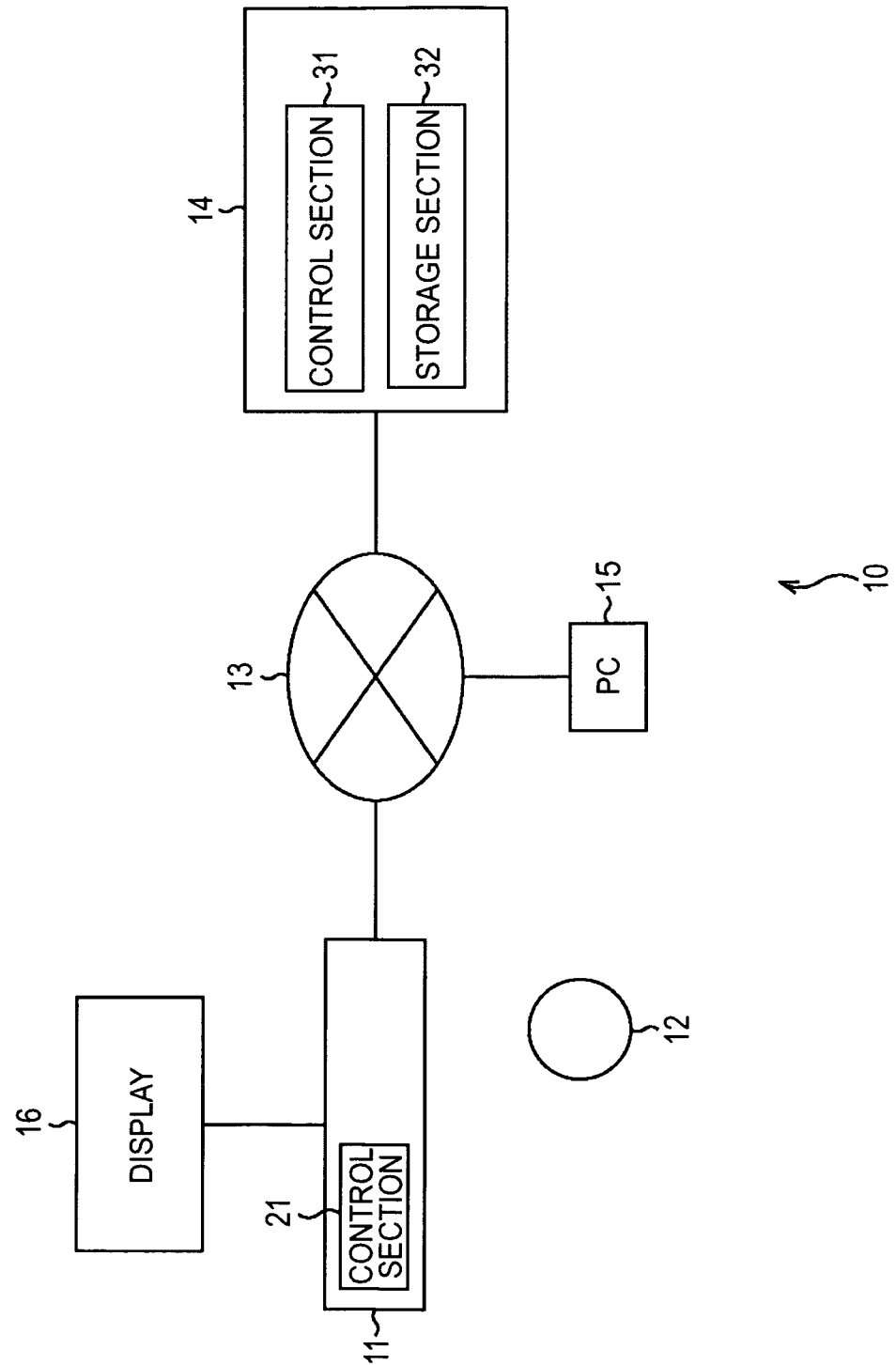
FIG. 1 is a block diagram showing an example of the configuration of a network system 10 according to one embodiment of the present invention.

FIG. 1 is a block diagram showing an example of the configuration of a network system 10 according to one embodiment of the present invention. The network system 10 is configured in such a way that, for example, the user of a terminal 11 can access a server 14 over a network 13, such as the Internet, to get an on-line album service or the like.

The on-line album service allows, for example, a user connectable to the network 13 to create an album-like Web site on the network 13 using the functions of the server 14. According to the on-line album service, for example, data of pictures taken with a digital camera is uploaded to the server 14 from a PC (Personal Computer) 15 connected to the network 13, and is stored in the server 14 as a unit of pictures called "album".

Then, the pictures uploaded from the PC 15 can be made public as a Web site having the pictures laid out like an album.

In the on-line album service, the uploaded pictures are made public to, for example, members registered beforehand in the server 14.

For example, a user accesses the server 14 over the network 13 using the PC 15 or the like to register as a member of the on-line album service. The registered user is informed of an URL (Uniform Resource Locator) or the like which specifies a memory area in the server 14 which is allocated for the on-line album service. The on-line album service may be designed in such a way that a registered user is informed of an URL or the like specifying a memory area assigned as one album which the user can edit. Thereafter, for example, the user can download data on pictures in a predetermined album to the PC 15, the terminal 11 or the like based on the URL to display the pictures.

The on-line album service may be designed in such a way that uploaded pictures are made public only to a family or friend. In this case, a password or the like for gaining access to the album is set, and data of pictures in a predetermined album can be acquired based on the URL and password or the like.

The on-line album service can allow a comment to be added to each of the pictures uploaded to the server 14. For example, a user who can access a predetermined album store an impression or the like of viewing an individual picture in the album as text data or so to thereby add the comment to the picture. Images which are made public by the on-line album service go public together with the added comments.

The terminal 11 can access the server 14 to get the on-line album service to acquire data of pictures in a desired album, and can display, for example, a slideshow of the pictures on the display 16.

A disc 12 is loaded into the terminal 11 to be played back. The terminal 11 is configured as, for example, a BD (Blu-ray Disc; Registered Trademark) player, BD recorder or the like, which has a connection terminal to the network 13 like the Internet.

The terminal 11 has a drive in which the disc 12 is to be loaded, and reads data from the disc 12 loaded in the drive. When the disc 12 is a writable recording medium, data may be written on the disc 12 with the terminal 11.

The disc 12 is, for example, a Blu-ray Disc (Registered Trademark). The Blu-ray Disc has a vast recording capacity of about 25 Gbytes as compared to the recording capacity of about 4.7 Gbytes of the conventional DVDs. A predetermined program is prerecorded on the disc 12, so that when the disc 12 is played back on the terminal 11, the program recorded on the disc 12 is executed by a control section 21.

The program prerecorded on the disc 12 is written in a program language which does not depend on the type of a computer, an OS installed thereon, etc. and is compatible with the use on a network, and can therefore be executed regardless of the maker and the type of the terminal 11. The program may be created by, for example, the maker of the disc 12 or the maker of the terminal 11.

As compared, for example, to the existing DVD, a Blu-ray Disc has enhanced navigation functions of presenting a user with the contents recorded on the Disc and setting a next operation upon reception of an input from the user. The navigation functions are realized as the program recorded on the Blu-ray Disc (disc 12) is executed by the control section 21. Specifically, various navigation functions are realized by application programs called BD-J written in the program language Java (Registered Trademark).

The control section 21 of the terminal 11 is configured to have, for example, a processor, a memory, etc., and controls the individual sections of the terminal 11. The control section 21 also controls processes related to communications between the terminal 11 and the server 14, which are carried out over the network 13. The control section 21 is configured to be able to execute software, such as a program read from the disc 12, as described later.

The server 14 is configured as, for example, a general-purpose computer or the like connectable to the network 13. The server 14 has a control section 31 having, for example, a processor, a memory, etc., and a storage section 32 constituted by an HDD (Hard Disc Drive) or the like. A program or the like which is executed by the control section 31 is stored in the storage section 32, so that when a predetermined program is executed by the control section 31, the on-line album service can be provided by the server 14. Data of pictures uploaded as pictures to be used in the on-line album service is stored in the storage section 32.

Although a single PC 15 and a single terminal 11 are connected to the network 13 in the example shown in FIG. 1, a larger number of PCs and a larger number of terminals are actually connected to the network 13.

Figure 2:
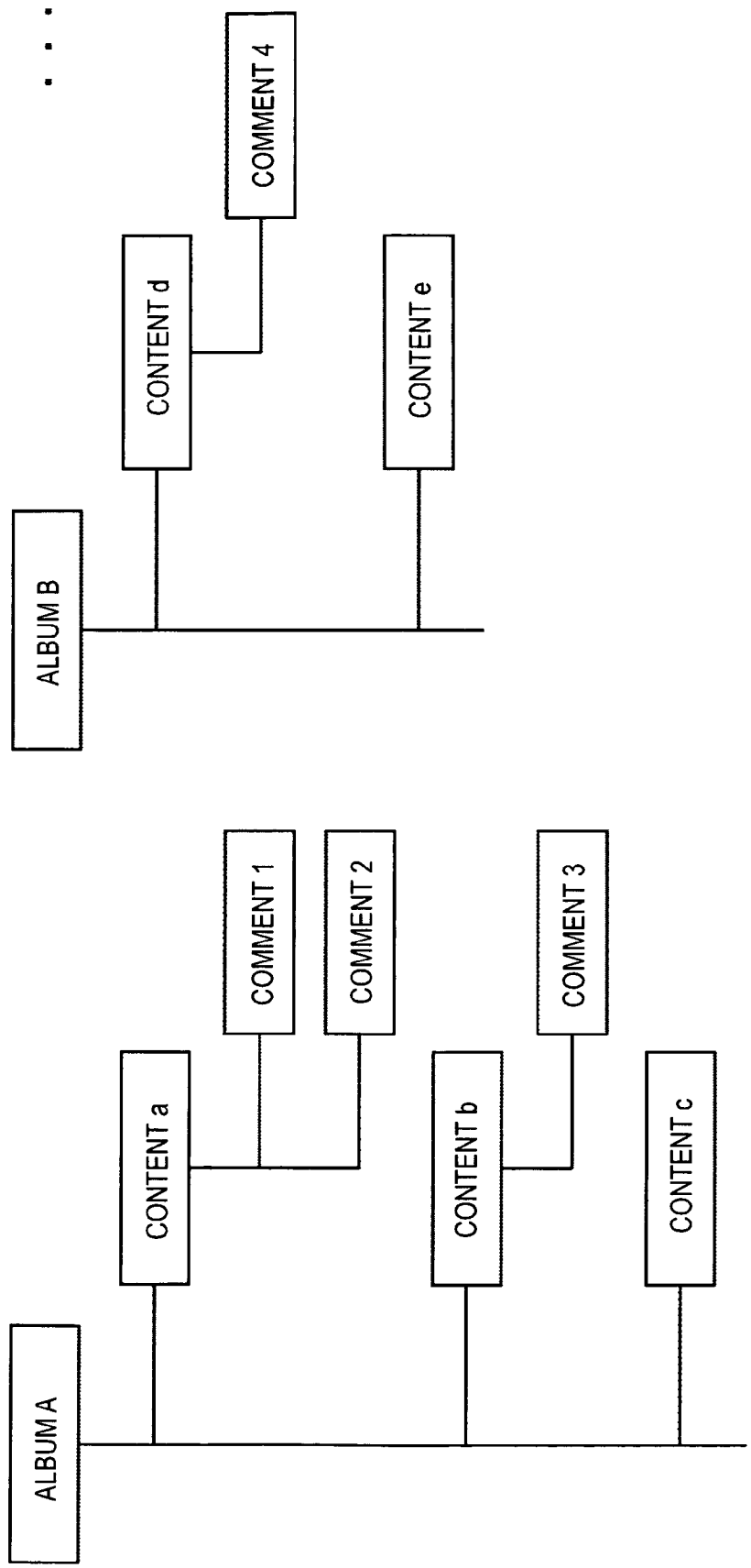
FIG. 2 is a diagram showing an example of the structure of data to be stored in a storage section in a server shown in FIG. 1.

FIG. 2 is a diagram showing an example of the structure of data to be stored in the storage section 32 in the server 14. In the example shown in FIG. 2, data to be stored in the storage section 32 has a directory structure.

In the example shown in FIG. 2, directories of an album A, album B, and so forth are created. The directories of the album A, album B, etc. are created by, for example, the user or the like of the PC 15 who receives the on-line album service before uploading picture data. For example, the album A is a wedding album, while the album B is an album of a family trip.

For example, the user of the PC 15 uploads data of pictures taken at a wedding, a wedding party, a honeymoon, etc. as pictures of the album A. Data or the like of pictures to be used in the on-line album service will be hereinafter called "content" herein. In this example, a content a, a content b and a content c are associated with the directory of the album A. A content d and a content e are associated with the directory of the album B. Each of the contents a to e is associated with, for example, a directory corresponding to data of a single still picture, and memory positions (addresses or the like) of data of the pictures are specified by the contents a to e, respectively.

That is, when the terminal 11 is provided with the on-line album service, the user access a desired directory (e.g., directory of the album A) in the storage section 32 of the server 14. Then, data of the pictures stored in association with the directory (e.g., data of each of the pictures corresponding to the contents a to c) is read out, and acquired (downloaded) by the terminal 11.

It is to be noted that the user can add or delete data of pictures to be stored in association with each album.

In addition, comments can be stored in the directories of the contents a to e in association therewith as needed. In this example, a comment 1 and a comment 2 are associated with the directory of the content a. Each of the comment 1 and the comment 2 are associated with, for example, the directory of data of a single comment, and memory positions of data of the comments are specified by the comments 1 and 2, respectively.

Figure 3:
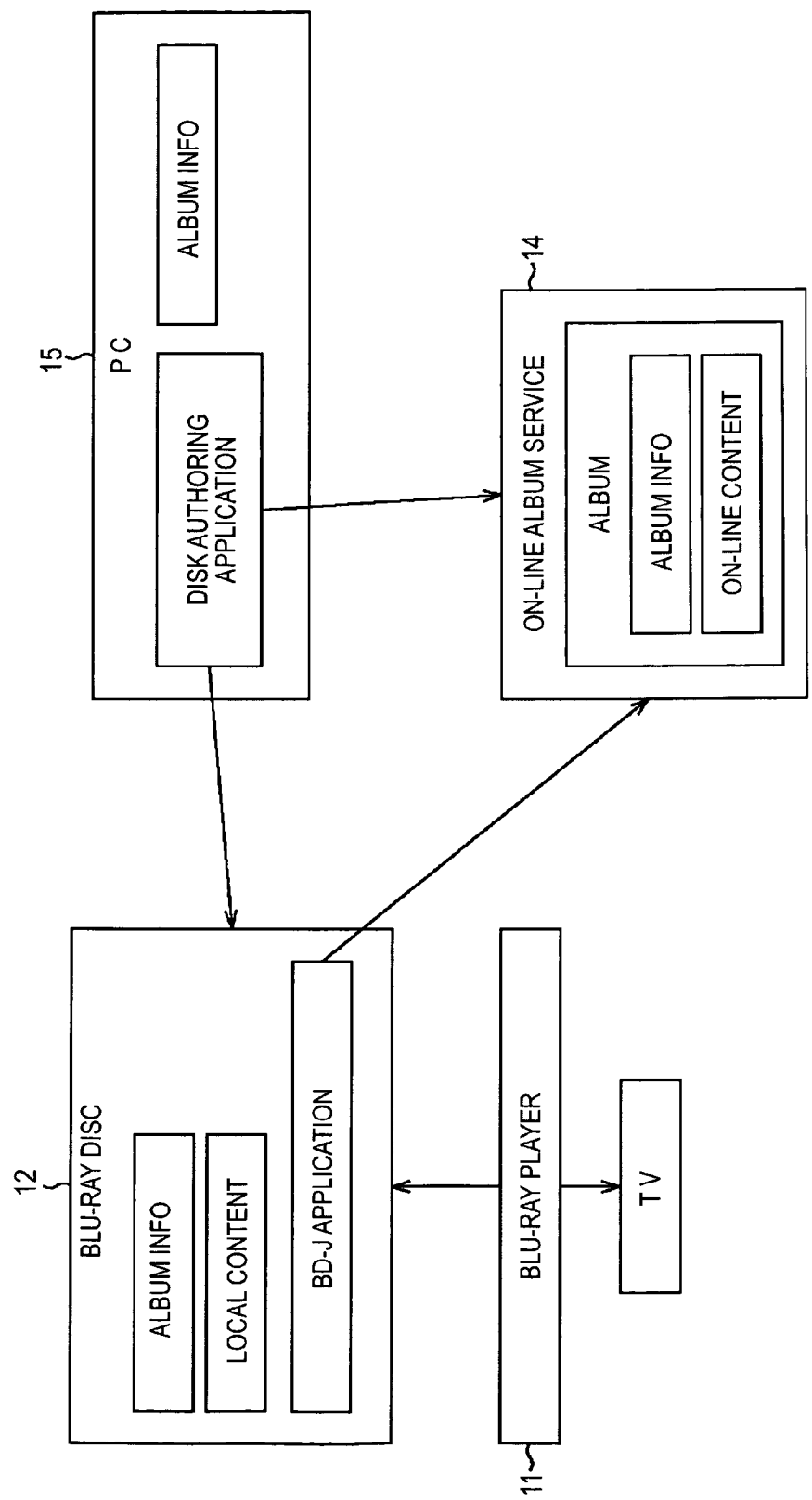
FIG. 3 is a diagram illustrating an example of data to be stored on a disc.

FIG. 3 is a diagram illustrating an example of data to be stored on the disc 12. It is assumed that data is recorded on the disc 12 by the PC 15 in the example in FIG. 3. It is to be noted that the PC 15 has a drive in which the disc 12 is loadable.

A disc authoring application program is installed on the PC 15. As the disc authoring application program is executed, data is written on the disc 12.

The PC 15 has a recording medium, such as an HDD, in which contents of data or the like of pictures taken with a digital camera or the like are stored. The PC 15 is configured to be able to access the server 14 over the network 13, so that the PC 15 can also acquire a content using the on-line album service provided by the server 14. When the directory of a predetermined album in the server 14 is accessed, the memory positions of the contents of the album and data of "Album Info" are specified, so that those pieces of data can be acquired. The "Album Info" data is data for accessing a predetermined album in the server 14; for example, it is data including an URL specifying the album in the server 14, an ID, a password, and so forth.

It is to be noted that a content which is acquired by using the on-line album service will be hereinafter called "on-line content".

In addition, the byte codes of application programs called the BD-J mentioned above are prestored in the PC 15.

At the time of writing data on the disc 12 using the PC 15, for example, contents of data or the like of pictures taken with a digital camera or the like, which are stored in the HDD of the PC 15 beforehand, are acquired as the picture to be written on the disc 12. Alternatively, the album of the pictures to be written on the disc 12 may be accessed to acquire (download) the on-line contents of the album.

At this time, data of "Album Info" of the album of the on-line album service corresponding to the disc 12 is also acquired through downloading or the like from the server 14. Then, the "Album Info" data, the on-line contents, and the byte codes of the BD-J are written on the disc 12 to recorded thereon by the processing of the disc authoring application program.

A content recorded on the disc 12 will be hereinafter called "local content". A local content is designed in such a way that once written on the disc 12, it cannot be added or deleted. An on-line content, however, may be added or deleted.

When the disc 12 is loaded on the BD player (terminal 11 in FIG. 1) and is played back, the "Album Info" data, local contents and the BD-J byte codes are read from the disc 12, and those pieces of data are loaded in the memory of the control section 21.

As the application programs of the BD-J are executed by the control section 21, the terminal 11 accesses a predetermined album in the server 14 to download the on-line contents, and store the on-line contents in the memory of the control section 21. That is, the application programs of BD-J automatically execute a log-in process to the server 14 and a content downloading process for utilizing the on-line album service.

Further, the control section 21 displays, for example, a slideshow of pictures of the local contents and on-line contents on the display 16. That is, the application programs of BD-J automatically execute, for example, a process of displaying pictures of data read from the disc 12 and individual pictures of data downloaded from the server 14 in order in a predetermined display time.

As described above, the on-line album service can allow a user to add or delete data of a picture to be stored in association with each album. While a local content recorded on the disc 12 cannot be added or deleted, therefore, an album can be virtually edited by adding or deleting a picture to the album of the on-line album service.

That is, each album created by recording a local content on the disc 12 can be edited ex post facto.

Next, an example of the disc authoring process executed by the PC 15 will be described referring to a flowchart in FIG. 4.

This process is executed based on, for example, a user's operation, user instruction and the like.

In step S21, the PC 15 determines whether or not an authorable disc 12 is loaded in the local drive, and stands by until it determines that an authorable disc 12 is loaded. When it is determined in step S21 that an authorable disc 12 is not loaded, an error process may be executed after which the disc authoring process will be terminated.

When it is determined in step S21 that an authorable disc 12 is loaded, the process proceeds to step S22.

In step S22, the PC 15 acquires contents to be written on the disc 12. At this time, for example, contents stored in the HDD of the PC 15 beforehand are acquired.

In step S23, the PC 15 acquires "Album Info" data.

In step S24, the PC 15 writes the contents acquired in the process of step S22 and the "Album Info" data acquired in the process of step S23 on the disc 12.

In step S25, the PC 15 writes the BD-J byte codes on the disc 12.

Alternatively, the contents of an album in the on-line album service may be written on the disc 12. In this case, the PC 15 accesses the server 14 and further accesses a predetermined album in the on-line album service provided by the server 14. Then, for example, the process of the disc authoring application program accepts selection of contents to be recorded on the disc 12 at which time, the user designates a desired album in the on-line album service.

Accordingly, in step S22, the PC 15 acquires (downloads) the contents of the on-line album service. In step S23, the "Album Info" data of this album is acquired.

The disc authoring process is executed in this manner. This can allow the user of the PC 15 to create a disc on which the data described above referring to FIG. 3 is recorded.

Figure 4:
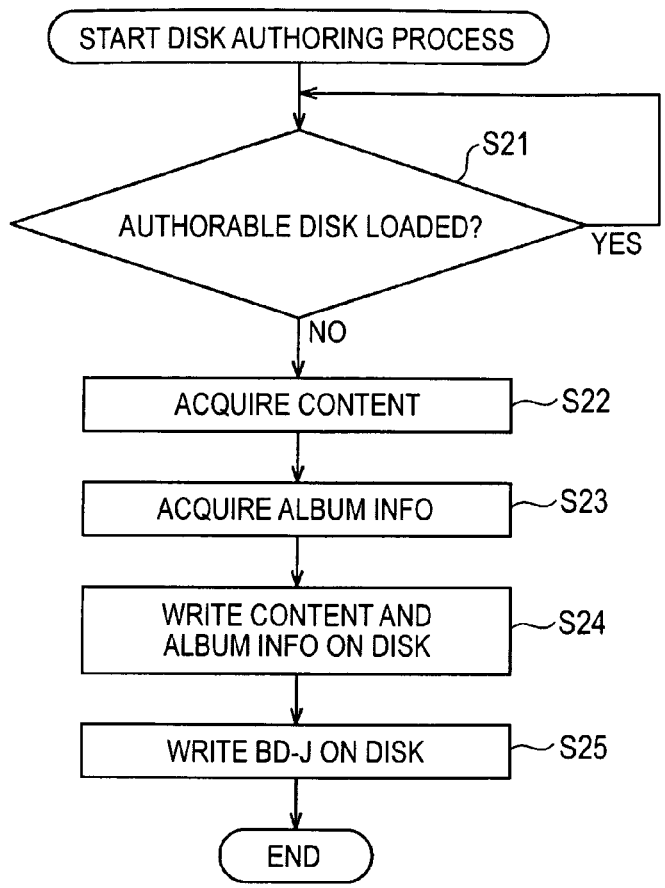
FIG. 4 is a flowchart illustrating a disc authoring process.

The user of the PC 15 distributes the disc 12 created by the disc authoring process shown in FIG. 4 to, for example, a friend, a family or the like. Here, a friend, a family or the like is a person to whom the user wants to show the album of the pictures of the contents recorded on the disc 12.

Figure 5:
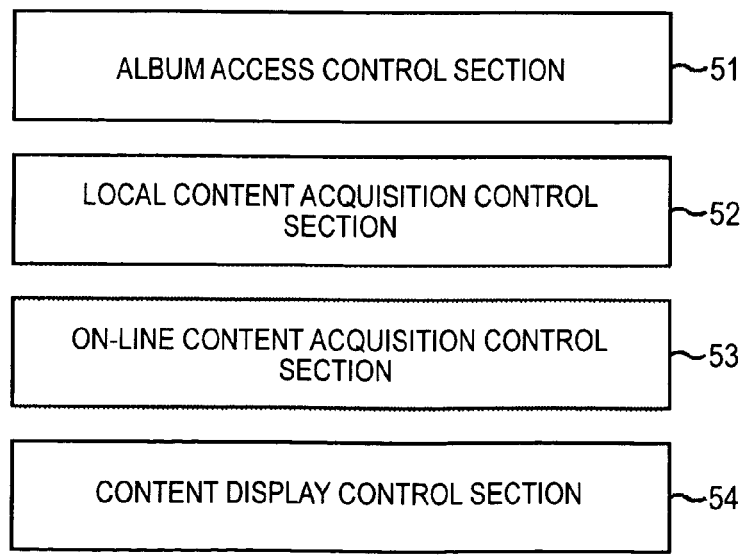
FIG. 5 is a block diagram showing an example of the functional structure of BD-J, which is software to be executed by a control section and recorded on a disc.

FIG. 5 is a block diagram showing an example of the functional structure of the BD-J to be recorded on the disc 12. An album access control section 51 shown in FIG. 5 is configured to acquire "Album Info" data to control the execution of processes, such as connection to the server 14 over the network 13. The album access control section 51 finally controls an access to a predetermined album of the on-line album service which is specified by the "Album Info" data.

The album access control section 51 controls, for example, a process of communication with the server 14 over the network 13. In addition, the album access control section 51 controls a process to log in the server 14 for using the on-line album service, and a process of inputting a password as needed. Further, the album access control section 51 controls a process of accessing to an album (e.g., album A, album B in FIG. 2) having an on-line contents to be downloaded.

A local content acquisition control section 52 controls the execution of a process of reading local contents recorded on the disc 12 and storing the contents in the memory.

An on-line content acquisition control section 53 selects contents to be acquired among the on-line contents of the album accessed by the process of the album access control section 51, and downloads the selected contents.

A content display control section 54 controls the display of the on-line contents downloaded from the server 14 and the local contents read from the disc 12. The content display control section 54 controls the execution of, for example, a process of displaying a slideshow of the pictures of the local contents and the on-line contents on the display 16.

Figure 6:
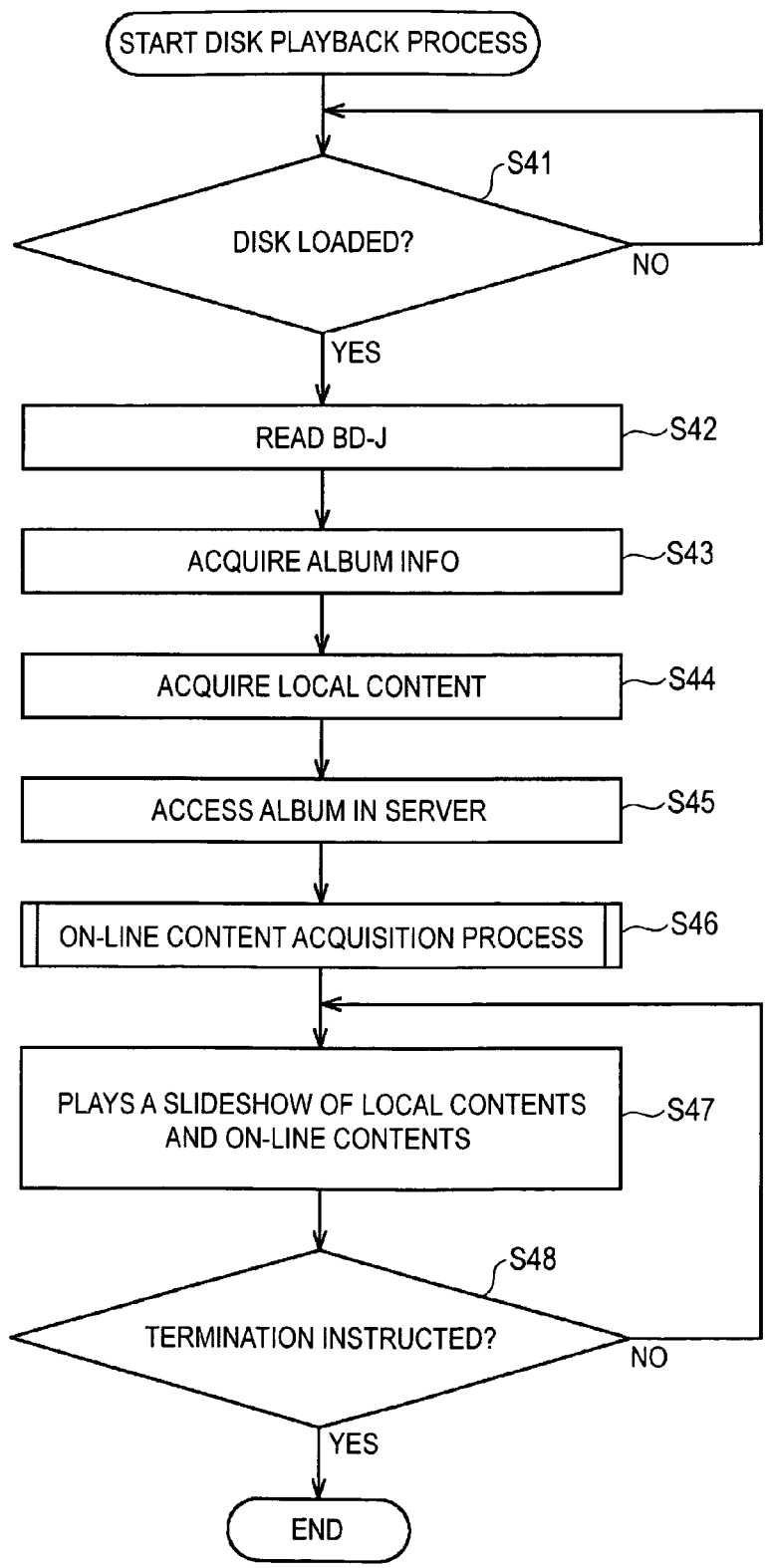
FIG. 6 is a flowchart illustrating an example of a disc playback process.

Next, a disc playback process which is executed by the terminal 11 will be described referring to a flowchart in FIG. 6. This process is executed, for example, when the user who has received the disc 12 created by the disc authoring process in FIG. 4 instructs playback of the disc 12 on the terminal 11.

In step S41, the control section 21 of the terminal 11 determines whether or not the disc 12 loaded in the local drive, and stands by until it determines that the disc 12 is loaded. When it is determined in step S41 that the disc 12 is not loaded, an error process may be executed after which the disc playback process will be terminated.

When it is determined in step S41 that the disc 12 is loaded, the process proceeds to step S42.

In step S42, the control section 21 reads the BD-J byte codes recorded on the disc 12, and loads the BD-J byte codes in the memory. Then, the application programs of the BD-J are executed by the control section 21.

In step S43, the album access control section 51 reads "Album Info" data recorded on the disc 12, and stores the data in the memory or the like of the control section 21.

In step S44, the local content acquisition control section 52 reads local contents recorded on the disc 12, and stores the local contents in the memory or the like of the control section 21.

In step S45, the album access control section 51 accesses a predetermined album in the server 14 which is specified by the "Album Info" data acquired in the process of step S43. At this time, for example, the communication process between the terminal 11 and the server 14 is started over the network 13. In addition, log-in to the server 14 is executed to use the on-line album service, and a password is input as needed. Further, an album having on-line contents to be downloaded is accessed.

Figure 7:
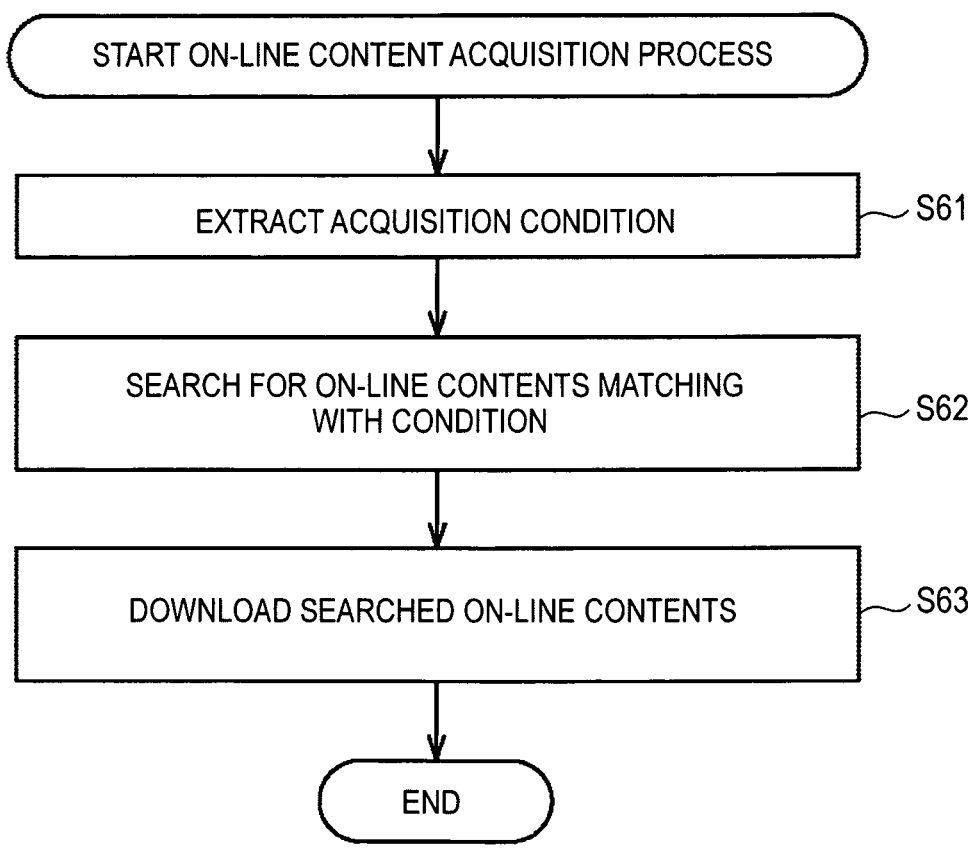
FIG. 7 is a flowchart illustrating an example of an on-line content acquisition process.

In step S46, the on-line content acquisition control section 53 executes an on-line content acquisition process to be described later referring to FIG. 7. Accordingly, contents to be acquired in the album accessed in the process of step S45 is specified and downloaded.

In step S47, the content display control section 54 displays a slideshow of the pictures of the local contents acquired in the process of step S44 and the on-line contents acquired in the process of step S46 on the display 16. At this time, comments added to the on-line contents may be superimposed on the pictures and displayed as needed.

In step S48, it is determined whether or not the termination of the process is instructed. When it is determined that the process termination has not been instructed yet, the process is returned to step S47.

When the user instructs the process termination by manipulating a remote controller or the like (not shown), for example, it is determined in step S48 that the process termination has been instructed, and the process will be terminated.

The disc 12 is played back in this manner.

Next, a detailed example of the on-line content acquisition process in step S46 in FIG. 6 will be described referring to a flowchart in FIG. 7.

In step S61, the on-line content acquisition control section 53 extracts an acquisition condition. At this time, the condition for on-line contents to be acquired, for example, is extracted. For example, the acquisition condition is set to acquire those of the on-line contents accessed in the process of step S45 which are not recorded on the disc 12. The acquisition condition may be set based on the user's operation or may be preset.

The shooting date and time or the like of pictures of on-line contents may be set as the acquisition condition. Information representing the shooting date and time of a picture is added to data of the picture. For example, the acquisition condition may be set in such a way that only on-line contents taken on or after Dec. 8, 2008 are acquired. Alternatively, the acquisition condition may be set in such a way that only on-line contents taken in the period from Dec. 1, 2008 to Dec. 8, 2008 are acquired.

When GPS (Global Positioning System) information representing the latitude and longitude of the shooting location of on-line contents is stored in association with the on-line contents, for example, an acquisition condition based on the GPS information may be set. For example, on the premise that the latitude and longitude of the shooting location of local contents are specified beforehand, the acquisition condition may be set in such a way that on-line contents taken near the shooting location of the local contents are specified and acquired based on the GPS information. This can allow an album to be edited so that, for example, only pictures taken at home are displayed or only pictures taken at school are displayed.

Further, pictures of on-line contents may be analyzed beforehand to identify facial pictures, and the acquisition condition may be set in such a way that only on-line contents with pictures showing the same person are acquired. This can allow, for example, only pictures showing children among a family are displayed. Accordingly, an album can be edited in such a way that, for example, recording of the growth of children is displayed.

Of course, the acquisition condition may be set in such a way that all of the on-line contents of the album accessed in the process of step S45 are acquired.

In step S61, such an acquisition condition is extracted.

In step S62, the on-line content acquisition control section 53 searches for an on-line content which matches with the acquisition condition extracted in the process of step S61.

In step S63, the on-line content acquisition control section 53 downloads the on-line content searched in the process of step S62.

On-line contents are acquired in the above manner.

The processes described above referring to FIGS. 6 and 7 can permit a slideshow of the pictures of local contents and on-line contents to be displayed on the display 16.

In the display of a slideshow in step S47, for example, local contents and on-line contents may be displayed in order, or may be displayed in a combined form.

Figure 8:
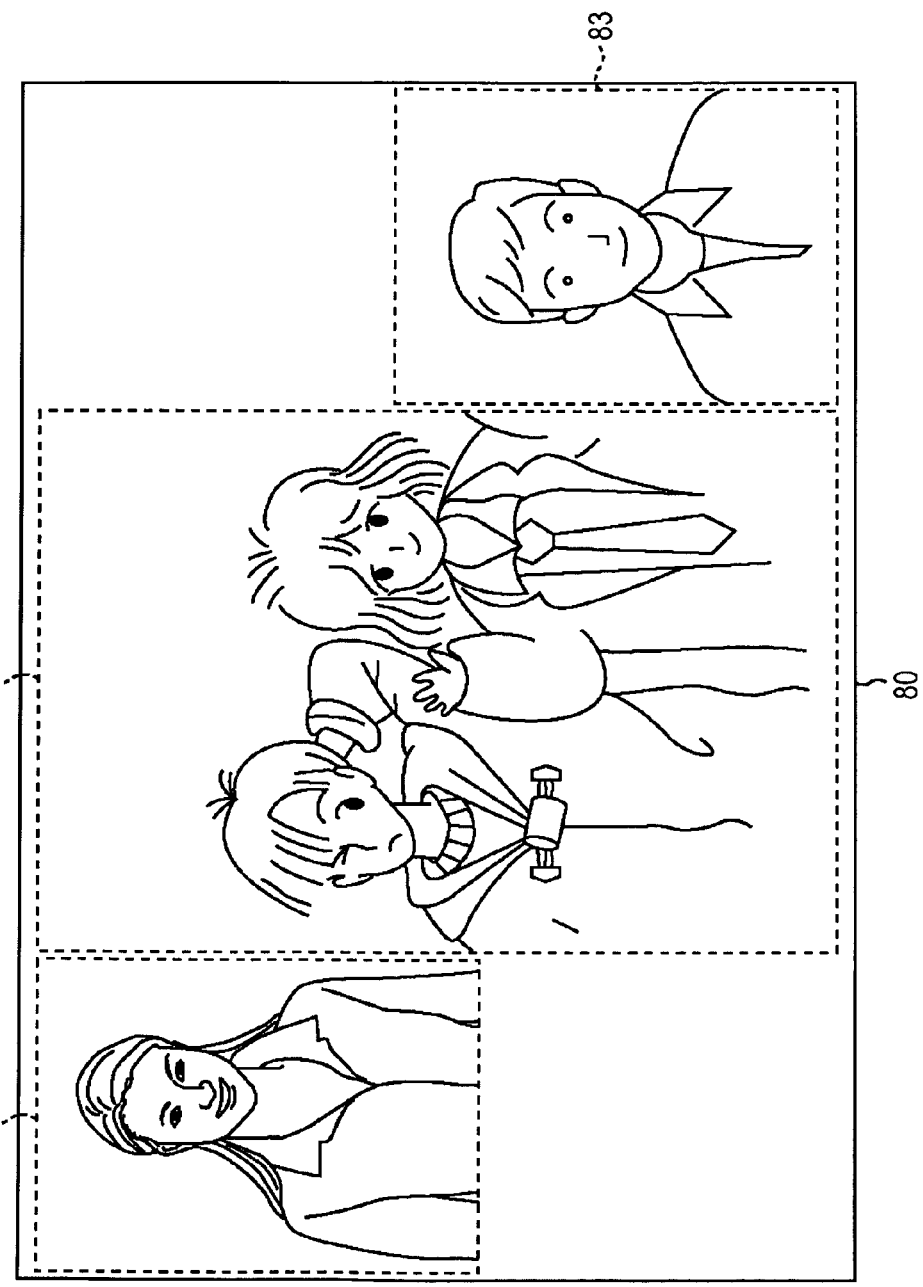
FIG. 8 is a diagram showing an example of the screen of a display when a local content and an on-line content are displayed in a combined form.

FIG. 8 is a diagram showing an example of the screen of the display 16 when a local content and an on-line content are displayed in a combined form.

In the example of FIG. 8, a picture 81 of a local content is displayed in the center on a screen 80 of the display 16, and a picture 82 of an on-line content and a picture 83 of an on-line content are respectively displayed at the upper left of the screen 80 and at the lower right of the screen 80 in combination with the picture 81.

For example, the picture 81 is taken by a professional cameraman at a wedding of a user A. The user A records local contents, such as the picture 81 taken by the professional cameraman, on the disc 12, and distributes the local contents to a user B and a user C as friends who have attended the wedding as an album which can use the on-line album service. The users B and C use the on-line album service to upload the picture 82 and the picture 83 taken by themselves as pictures of the album. When the disc 12 is loaded in the terminal 11 to display a slideshow of pictures of the album A thereafter, the image as shown in FIG. 8 is displayed.

In this way, the user A, the user B and the user C can view the pictures 82 and 83, taken by the users B and C, together with the picture 81 taken by the professional cameraman. Accordingly, the snapshot pictures 82 and 83 are simultaneously displayed together with the picture 81 as a commemorative picture, thus making the memory of the wedding more impressive.

As different contents are added and displayed at each browsing, for example, the same album can be enjoyed repeatedly. Further, pictures with high resolution have a large amount of data so that the picture data can be recorded on the disc 12 for distribution, while pictures with low resolution have a small amount of data and can thus be provided as on-line contents.

Figure 9:
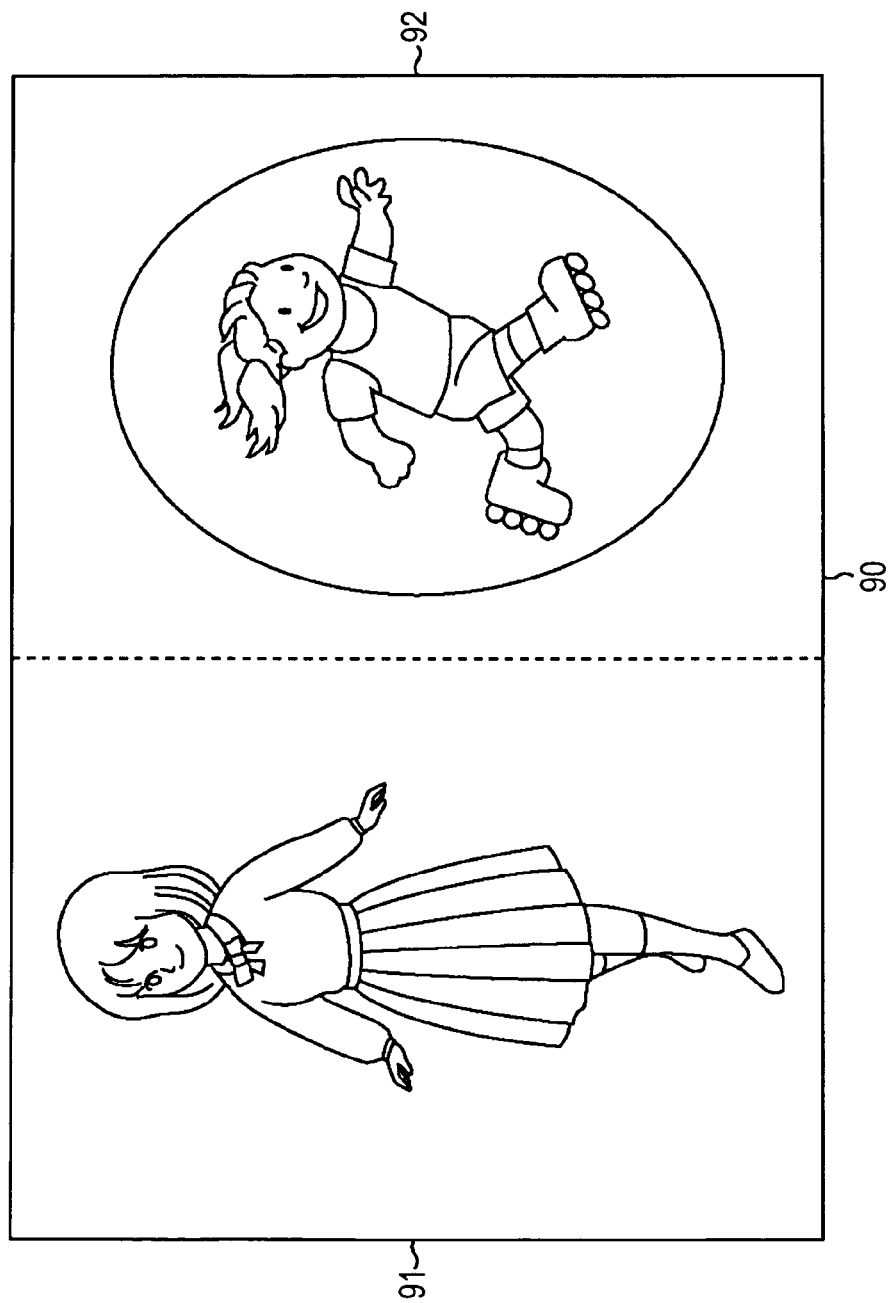
FIG. 9 is a diagram showing another example of the screen of a display when a local content and an on-line content are displayed in a combined form.

FIG. 9 is a diagram showing another example of the screen of the display 16 when a local content and an on-line content are displayed in a combined form.

In the example of FIG. 9, a picture 91 of the on-line content is displayed on the left side of a screen 90 of the display 16 and a picture 92 of the local content is displayed on the right side of the screen.

For example, the picture 91 and the picture 92 show the same person taken as the subjects, the picture 91 taken recently while the picture 92 was taken several years ago. This display can show, for example, the recent state of the person in contrast to the past thereof.

For example, a user D may give a user E or a parent a disc 12 as an album of pictures of a child of the user D. The user E who has received the disc 12 can play back the disc 12 on the terminal 11 to view the pictures of the grandchild recorded on the disc 12.

Further, as described above, the on-line album service can allow on-line contents to be added or deleted to or from an album as needed. The user D sequentially uploads pictures of the child of the user D to add them to the album of the on-line album service.

When the user E plays back the disc 12 on the terminal 11 thereafter, the user E can view newly added pictures of the grandchild as well as the pictures of the grandchild recorded on the disc 12. At this time, the image as shown in FIG. 9 can be displayed on the display 16. That is, as the process described above referring to FIG. 6 is executed, an on-line content added to the album of the on-line album service is automatically acquired, and the on-line content and the local content are displayed on the display 16.

Because "Album Info" data for accessing to a predetermined album in the server 14 is recorded on the disc 12, as described above, the user E can acquire on-line contents without knowing, for example, how to use the on-line album service. Further, the user E can view the newly added pictures of the grandchild without performing, for example, an operation of logging in the on-line album service every time. Even without owning a machine like a PC, the user E can display on-line contents on the display connected to the local terminal 11.

Further, with a password or the like set to the album of the on-line album service, only the user D and the user E can be permitted to view the pictures of the album. In this case, the user E can view the newly added pictures of the grandchild without performing, for example, an operation of entering the password every time. Therefore, when the user D and the user E are living at far locations, for example, the user E can view the pictures of the grandchild growing any time.

Because the user E can be made aware of newly added contents naturally, the user D merely needs to upload pictures to allow the user E to view the pictures. Further, setting a password or the like can inhibit other users than the user E to view the pictures in the album. Therefore, the user D can enjoy editing the album without worrying about the security.

This can allow the user E to feel the growth of the grandchild, and achieve a more enjoyable slideshow display.

In case of using the on-line album service in the past, a user normally needs to access the server using a PC or the like, and needs to make a membership registration for the on-line album service beforehand. Therefore, the user cannot view pictures in a predetermined album before making a membership registration by operating a PC or the like.

If a DVD having a plurality of pictures recorded thereon is played back on a DVD player to display the pictures on the display, pictures of an album can be viewed without making a membership registration by operating a PC or the like. However, DVDs are generally limited in terms of the sequential writing, so that the contents of an album once created cannot be changed. Even if an album is created and distributed, a person obtaining the album may be bored with the album soon.

According to the embodiment of the invention, by way of contrast, pictures are displayed when the disc 12 is played back, so that the user can view pictures of an album without making a membership registration by operating a PC or the like. Further, an album containing pictures recorded on the disc 12 whose sequential writing is limited can be edited in a so-called virtual manner by adding pictures using the on-line album service. The use of the invention can allow a user to repeatedly enjoy, for example, a same album.

Although the foregoing description has been given of the example where a slideshow of pictures is displayed, a slideshow should not necessarily be displayed. Although the foregoing description has been given of the example where contents are still pictures, contents may be moving pictures instead. Further, data to be recorded on the disc 12 is not limited to those pictures, but music data, movies, etc. may be recorded as contents on the disc 12.

Furthermore, although the foregoing description of the embodiment of the invention has been given of the example where the slideshow display process in FIG. 5 is executed as the control section 21 executes the application programs of the BD-J recorded on the disc 12, the embodiment is not restrictive. For example, the slideshow display process in FIG. 5 can of course be executed as the control section 21 executes application programs recorded on a recording medium other than the disc 12.

Next, an example of a method of fabricating a disc or a recording medium on which data reproducible on the terminal 11 is recorded will be described referring to FIGS. 10 and 11.

Figure 10:
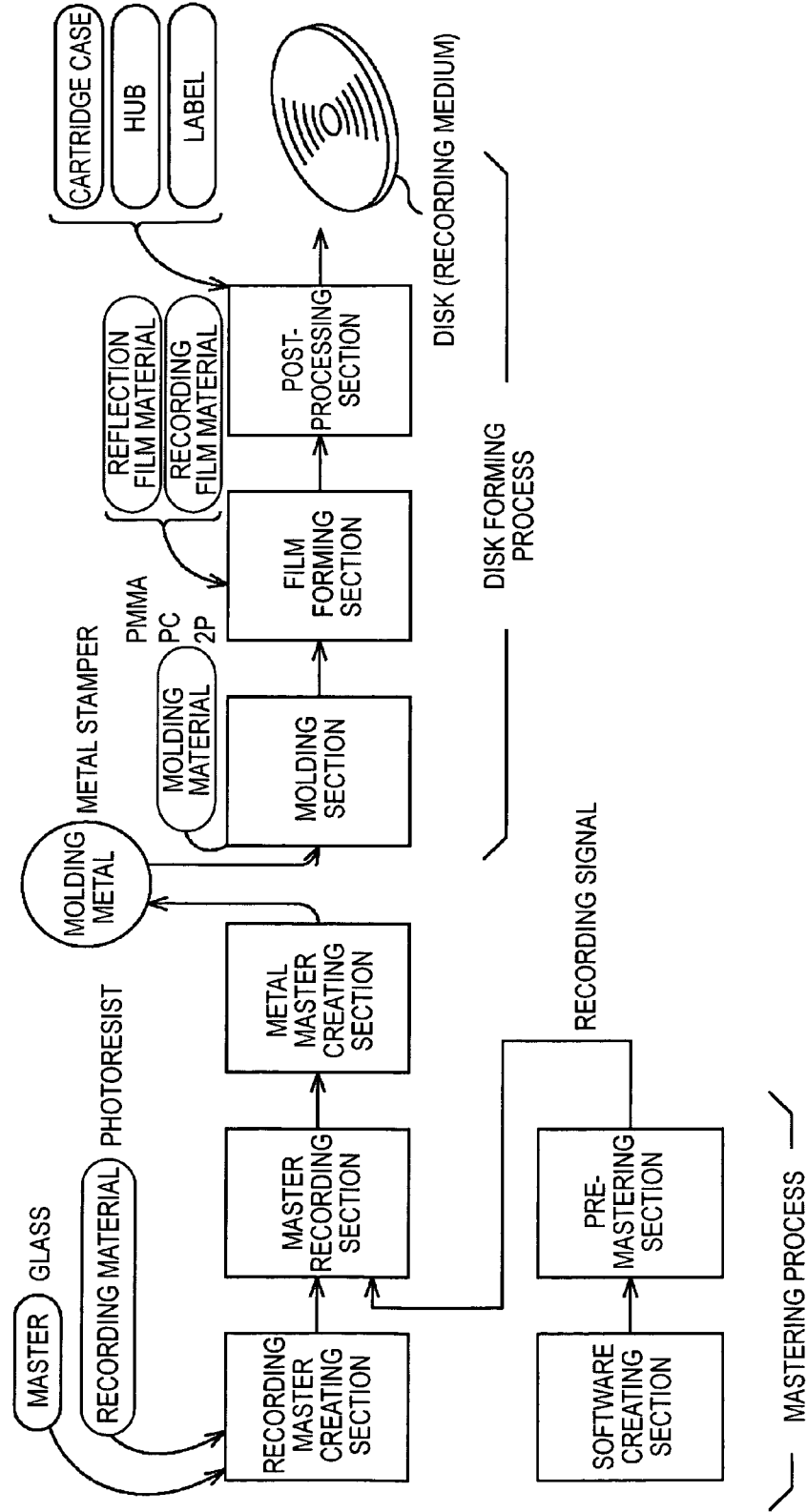
FIG. 10 is a diagram for explaining manufacture of a recording medium on which data reproducible at a terminal is recorded.

As shown in FIG. 10, a master of, for example, glass or the like is prepared, and a recording material to be a photoresist, for example, is applied to the master. As a result, a recording master is created.

Then, a software creating section creates software to be recorded on a recording medium which can be played back on the terminal 11. In case where the software creating section creates and records data of contents like movies, for example, the software creating section is configured as shown in FIG. 11.

Figure 11:
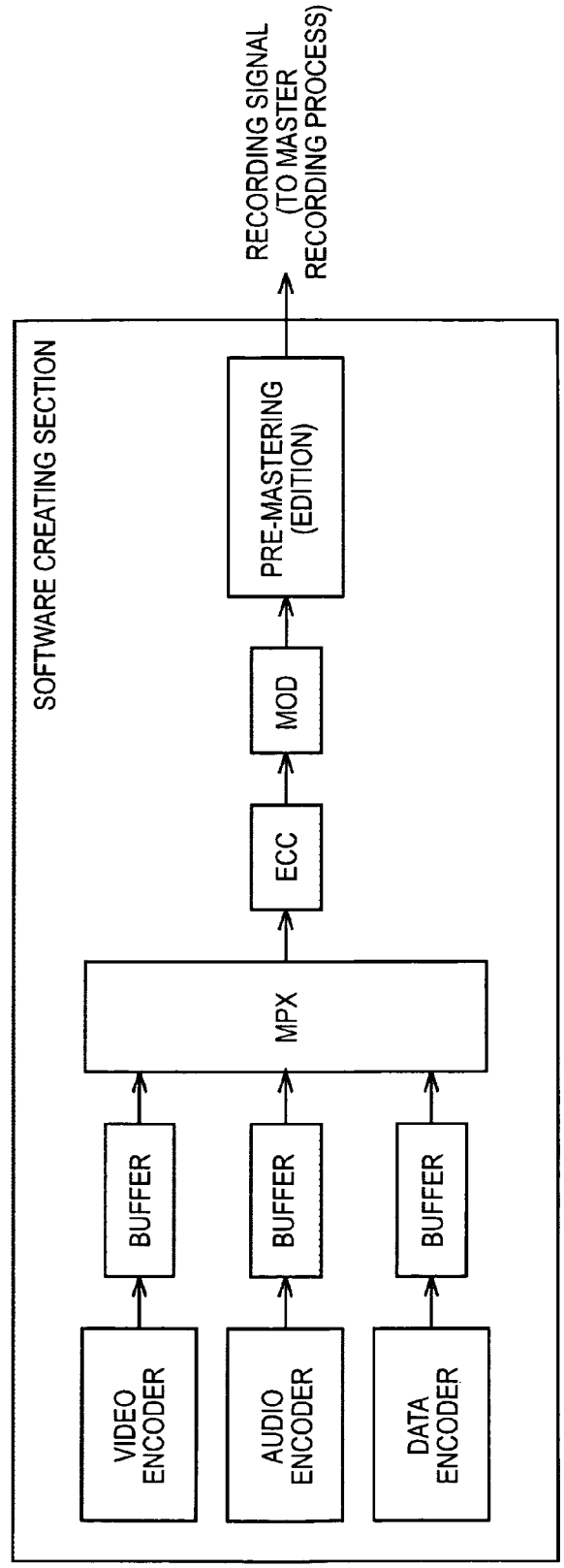
FIG. 11 is a diagram for explaining manufacture of a recording medium on which data reproducible at a terminal is recorded.

In the software creating section in FIG. 11, video data encoded by an encoding apparatus (video encoder) in the form reproducible on the terminal 11 is temporarily stored in a buffer. Further, audio data encoded by an audio encoder is temporarily stored in a buffer, and data other than a stream (for example, Indexes, Playlist, PlayItem and the like), which is encoded by a data encoder, is temporarily stored in a buffer.

The video data, audio data, and data other than a stream, which are stored in the respective buffers, are multiplexed with a sync signal by a multiplexer (MPX), and a code for error correction is added to the multiplexed data by an error correction circuit (ECC). Then, the resultant data is subjected to predetermined modulation by a modulation circuit (MOD), and temporarily recorded on, for example, magnetic tape according to a predetermined format, thereby creating software to be recorded on a recording medium which can be played back on the terminal 11.

This software is edited (pre-mastered) as needed, generating signals of the format to be recorded on an optical disc. Then, a laser beam is modulated according to the recording signals, and the modulated laser beam is irradiated on the photoresist on the master, as shown in FIG. 10. As a result, the photoresist on the master is exposed according to the recording signals.

Thereafter, the master is developed to produce pits on the master. The master prepared in this manner is subjected to a process, such as electrocasting, to create a metal master having the pits on the glass master transferred thereon. A metal stamper is created as a molding die from the metal master.

A material, such as PMMA (acryl) or PC (PolyCarbonate), is injected into the molding die to be solidified by, for example, injection. Alternatively, after 2P (ultraviolet curable resin) or the like is applied onto the metal stamper, and is cured with irradiation of ultraviolet rays. Accordingly, pits on the metal stamper can be transferred on a replica made of a resin.

A reflection film is formed on the replica, produced in the above manner, by vapor deposition, sputtering or the like. Alternatively, a reflection film is formed on the replica by spin coating.

Thereafter, the inside and outside diameters of the disc are processed, and a necessary treatment, such as adhering two discs, is carried out. Further, a label is adhered to the resultant disc or a hub is attached thereto before the disc is inserted into a cartridge. A recording medium on which data reproducible on the terminal 11 is recorded is completed this way.

The above-described sequence of processes can be executed by hardware as well as by software. In case of executing the above-described sequence of processes by software, programs constituting the software are installed on a computer installed in dedicated hardware, or on, for example, a general-purpose computer 700 or the like as shown in FIG. 12 which can execute various functions by installing various programs, over a network or from a recording medium.

Figure 12:
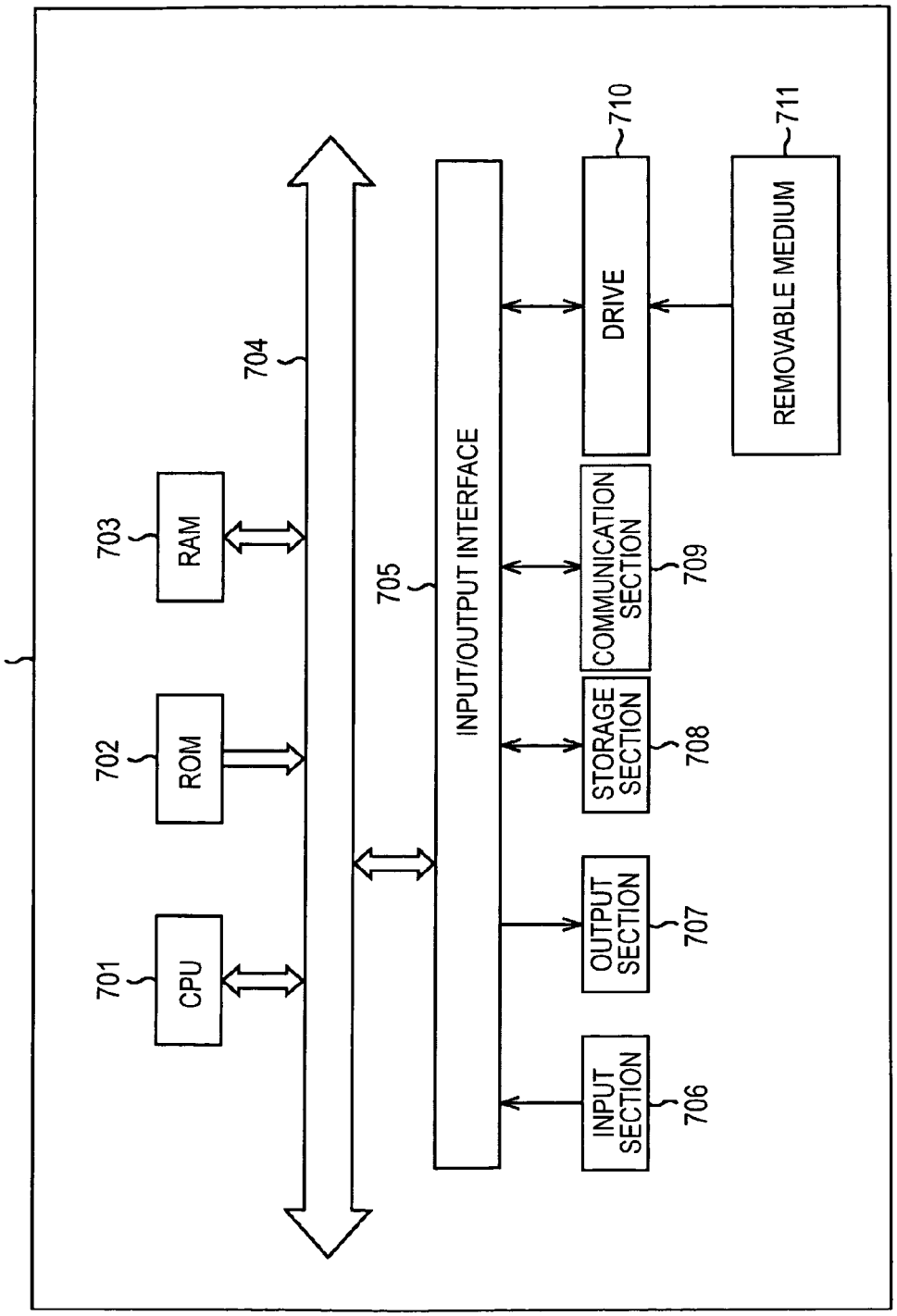
FIG. 12 is a block diagram showing an example of the configuration of a personal computer.

In FIG. 12, a CPU (Central Processing Unit) 701 executes various processes according to programs stored in an ROM (Read Only Memory) 702, or programs loaded into an RAM (Random Access Memory) 703 from a storage section 708. Data or the like necessary for the CPU 701 to execute various functions is adequately stored in the RAM 703.

The CPU 701, ROM 702, and RAM 703 are connected together by a bus 704. The bus 704 is also connected with an input/output interface 705.

The input/output interface 705 is connected with an input section 706 including a keyboard and a mouse, an output section 707 including a display like an LCD (Liquid Crystal Display) and a speaker, a storage section 708 having a hard disc or the like, and a communication section 709 having a network interface card, such as a modem or an LAN card. The communication section 709 executes a communication process over a network including the Internet.

The input/output interface 705 is also connected with a drive 710 as needed, in which a removable medium 711, such as a magnetic disc, an optical disc, a magneto-optical disc or a semiconductor memory, is adequately loaded, so that a computer program read therefrom is installed in the storage section 708 as needed.

In case of executing the above-described sequence of processes by software, programs constituting the software are installed over a network like the Internet, or from a recording medium such as the removable medium 711.

This recording medium is not limited to the removable medium 711, such as a magnetic disc (Floppy Disc (Registered Trademark)), an optical disc (including a CD-ROM (Compact Disc-Read Only Memory), DVD (Digital Versatile Disc)), a magneto-optical disc (including an MD (Mini-Disc) (Registered Trademark)), or a semiconductor memory, on which programs are recorded, but may be the program-recorded ROM 702 or the program-recorded hard disc included in the storage section 708, which is distributed to users in the form preinstalled in the apparatus body.

The above-described sequence of processes includes not only processes which are executed time-sequentially in the order named herein, but also processes which are executed in parallel or individually, not time-sequentially.

The embodiment of the invention is not limited to the above-described embodiment, but may be modified in various forms without departing from the scope of the invention.

What is claimed is:

1. A disc reproducing apparatus, comprising:
   a program readout section that plays back a disc loaded therein to read a program recorded thereon;
   a disc-content readout section that executes the read program to read a content recorded on the disc, the content read from the disc being associated with a particular shooting location at which such content has been taken;
   a network-content acquisition section that executes the read program to extract an acquisition condition based on the particular shooting location at which the content read from the disc has been taken, search for a content stored in a device connected over a network that matches the acquisition condition, and acquire over the network the content stored in the connected device that matches the acquisition condition, the content acquired from the device connected over the network thereby being an image taken near the shooting location associated with the content read from the disc; and
   a display control section that executes the read program to control display of the content read from the disc, and the content acquired from the device connected over the network.

2. The disc reproducing apparatus according to claim 1, further comprising network-information readout section that executes the read program to read information recorded on the disc and specifying a recording position of the content stored in the device connected over the network.

3. The disc reproducing apparatus according to claim 1, wherein the network-content acquisition section further specifies the content to be acquired based on information added to the content stored in the device connected over the network.

4. The disc reproducing apparatus according to claim 3, wherein a content taken within a predetermined period is specified based on information added to the content and representing a shooting date and time on which the content has been taken.

5. The disc reproducing apparatus according to claim 1, wherein the display control section combines the content read from the disc and the content acquired from the device connected over the network, and displays a resultant content.

6. A disc reproducing method, comprising:
   playing back a loaded disc to read a program recorded thereon;
   executing the read program to read a content recorded on the disc, the content read from the disc being associated with a particular shooting location at which such content has been taken;
   executing the read program to extract an acquisition condition based on the particular shooting location at which the content read from the disc has been taken, search for a content stored in a device connected over a network that matches the acquisition condition, and acquire over the network the content stored in the connected device that matches the acquisition condition, the content acquired from the device connected over the network thereby being an image taken near the shooting location associated with the content read from the disc; and
   executing the read program to control display of the content read from the disc, and the content acquired from the device connected over the network.

7. A processor executing a computer program embedded on a memory, the computer program for carrying out a disc reproducing method, the method comprising:
   reading a content recorded on a disc, the content read from the disc being associated with a particular shooting location at which such content has been taken;
   executing the read program to extract an acquisition condition based on the particular shooting location at which the content read from the disc has been taken, search for a content stored in a device connected over a network that matches the acquisition condition, and acquire over the network the content stored in the connected device that matches the acquisition condition, the content acquired from the device connected over the network thereby being an image taken near the shooting location associated with the content read from the disc; and
   controlling display of the content read from the disc, and the content acquired from the device connected over the network.

8. A non-transitory recording medium having recorded thereon a program for carrying out a disc reproducing method, the method comprising:
   reading a content recorded on a disc, the content read from the disc being associated with a particular shooting location at which such content has been taken;
   executing the read program to extract an acquisition condition based on the particular shooting location at which the content read from the disc has been taken, search for a content stored in a device connected over a network that matches the acquisition condition, and acquire over the network the content stored in the connected device that matches the acquisition condition, the content acquired from the device connected over the network thereby being an image taken near the shooting location associated with the content read from the disc; and
   controlling display of the content read from the disc, and the content acquired from the device connected over the network.

9. The non-transitory recording medium according to claim 8, which is configured as a disc where information specifying a recording position of a content stored in the device connected over the network, and the content are recorded together with the program.

10. A disc reproducing apparatus, comprising: a program readout unit playing back a disc loaded therein to read a program recorded thereon; a disc-content readout unit executing the read program to read a content recorded on the disc, the content read from the disc being associated with a particular shooting location at which such content has been taken a network-content acquisition unit executing the read program to executing the read program to extract an acquisition condition based on the particular shooting location at which the content read from the disc has been taken, search for a content stored in a device connected over a network that matches the acquisition condition, and acquire over the network the content stored in the connected device that matches the acquisition condition, the content acquired from the device connected over the network thereby being an image taken near the shooting location associated with the content read from the disc and a display control unit configured to execute the read program to control display of the content read from the disc, and the content acquired from the device connected over the network.

\* \* \* \* \*